(No Model.)

C. & A. J. CHASE.
APPARATUS FOR DISTILLING WATER.

No. 558,775. Patented Apr. 21, 1896.

Witnesses:
Robert Emmett
J. A. Rutherford

Inventors:
Confucius Chase
Andrew J. Chase,
By James L. Norris,
Atty.

UNITED STATES PATENT OFFICE.

CONFUCIUS CHASE AND ANDREW J. CHASE, OF BOSTON, MASSACHUSETTS.

APPARATUS FOR DISTILLING WATER.

SPECIFICATION forming part of Letters Patent No. 558,775, dated April 21, 1896.

Application filed June 23, 1891. Serial No. 397,222. (No model.)

*To all whom it may concern:*

Be it known that we, CONFUCIUS CHASE and ANDREW J. CHASE, citizens of the United States, residing at Boston, in the county of Suffolk and State of Massachusetts, have invented new and useful Improvements in Apparatus for Distilling Water, of which the following is a specification.

Our invention relates to a water-distilling apparatus adapted for the aeration, with filtered and heated air, of the water that has lost its air by boiling.

The invention consists in a distilling apparatus comprising an evaporating vessel, a vapor-condensing chamber communicating with the evaporating vessel, and having an outlet for escape of gases, a drip-trough or catch-basin at the base of the vapor-condensing chamber, a pipe leading from said drip-trough or catch-basin to conduct the distilled water to a suitable receptacle, a cold-water chamber surrounding the vapor-condensing chamber, a faucet and conduit for controlling the flow of water from said cold-water chamber into the evaporating vessel, and a hot-air flue leading to the vapor-condensing chamber and supplied with filtering material to purify the heated air before it comes in contact with the vapor of the boiling water, whereby pure aerated distilled water can be obtained.

The invention further consists in the construction, combination, and relative arrangement of parts in a water-distilling apparatus, as hereinafter more fully set forth.

Figure 1:
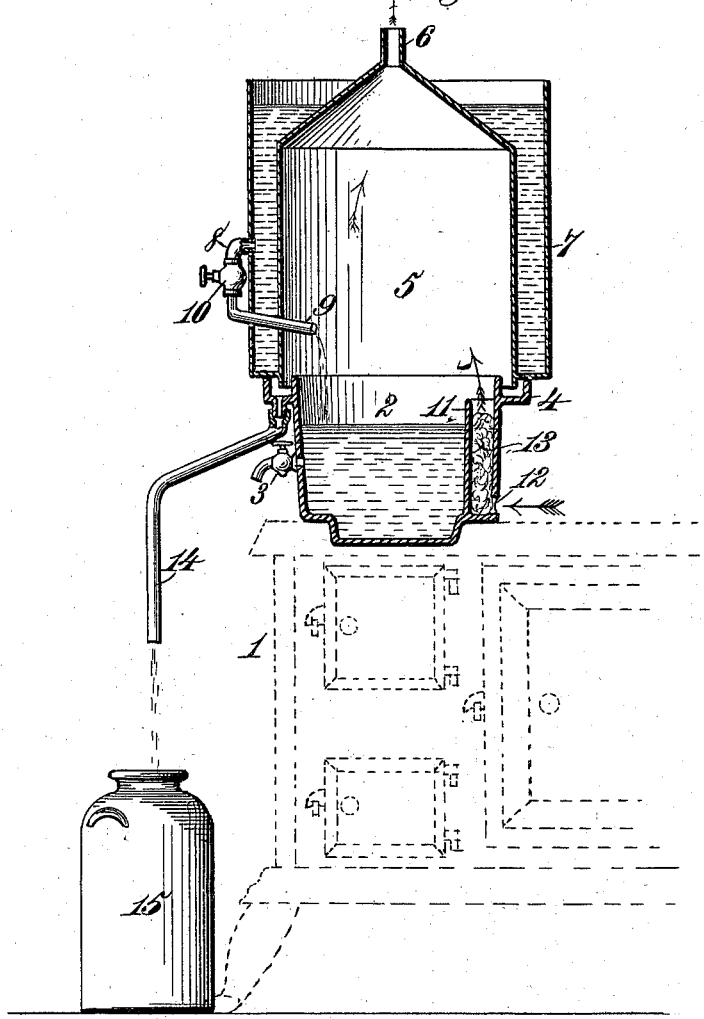
Figure 2:
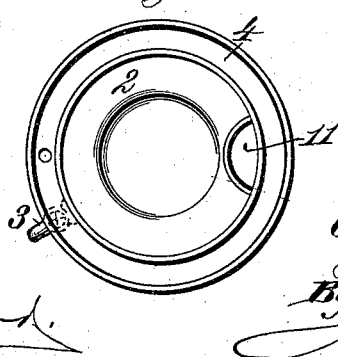

In the annexed drawings, Figure 1 is a sectional elevation of an improved water-distilling apparatus illustrating our invention. Fig. 2 is a plan of the evaporating vessel, hot-air flue, and drip-trough or catch-basin.

Referring to Fig. 1, the numeral 1 designates a portion of an ordinary kitchen-range or cook-stove on which the distilling apparatus may be conveniently supported to distil water for domestic purposes.

The reference-numeral 2 designates a water-evaporating vessel or kettle, which may be provided with a faucet 3 to draw off its contents when desired. The rim of this evaporating vessel, as shown, is provided with a surrounding annular trough or catch-basin 4, Fig. 2, to receive the water of condensation from a vapor-condensing chamber 5, that is located above and communicates directly with the evaporating vessel. The vapor-condensing chamber 5 is preferably cylindrical to conform with the shape of the evaporating vessel and may have a conical top, as shown, in the center of which is an outlet 6 for the escape of gases. To facilitate the condensation of vapors in the chamber 5, a water-jacket or cold-water chamber 7 is preferably formed around and integral with the said vapor-condensing chamber. The cold-water chamber 7 rests on the outer rim of the annular drip-trough or catch-basin 4, thereby supporting the vapor-condensing chamber 5, the inner wall of which may dip down somewhat into the annular trough or catch-basin, as shown, to facilitate the collection of distilled water therein. The condensing water jacket or chamber 7 may be open at the top and is extended upward around the conical top of the vapor-condensing chamber 5 to afford an extended condensing-surface. While the vapor could be condensed in the chamber 5 without a surrounding cold-water chamber, the employment of the latter is preferred, as thereby better results are obtained.

In order to conveniently supply the evaporating vessel 2 with water, it is preferable to provide the outside wall of the water-jacket 7 with a pipe connection 8, having an upper leg that communicates with the interior of the cold-water chamber and a lower leg that communicates with a pipe 9, which is passed through the water-jacket and into the vapor-condensing chamber 5 above the evaporating vessel 2, so that water may flow thereto from the water-chamber 7 when a cock or faucet 10 in the pipe connection 8 is opened. By this means the loss of water in the evaporating vessel 2 can be replaced at will by partially-warmed water from the chamber 7 and the latter can be replenished with cold water to maintain the vapor-condensing chamber 5 at a proper or suitable low temperature.

For the purpose of supplying the vapor-condensing chamber 5 with pure hot air, free from dust and other impurities, a vertical flue 11, Figs. 1 and 2, is provided in one side of the evaporating vessel. This flue 11 communicates at its upper end with the vapor-condensing chamber 5, and in the outer side of the flue, near its lower end, is an aperture 12 for the admission of air from the atmosphere. Within the flue 11 is placed a quantity of clean coarse sand, metallic shavings, or preferably mineral wool 13, or other suitable non-combustible filtering or screening material for the purpose of obstructing or preventing the passage of impurities in the air and rendering the air-supply as pure as possible before it is allowed to mingle with the vapor of water in the condensing-chamber.

When the apparatus is in operation, the water in the evaporating vessel 2 is vaporized by heat from the stove. The volatile gases, with a small quantity of vapor, escape through the outlet or open tube 6 at the top of the apparatus. This, together with the condensing of vapor, tends to a vacuum in the vapor-condensing chamber 5 and induces an upward current of air through the filtering material 13 in the flue 11, in passing through which the air-supply becomes heated and purified. It is obvious that the proximity of the flue 11 to the heat of the stove and of the boiling water in the kettle or evaporating vessel 2 will maintain the non-combustible filtering material 13 at a high temperature, so that the ascending current of air in passing through said flue and filtering material is not only relieved of impurities and foreign matters floating therein, but becomes highly heated and thereby greatly expanded, which latter condition is the most favorable for effecting its thorough mingling with and absorption of the vapor of water in the vapor-condensing chamber. As the operation thus proceeds, the aerated vapors condense on the inner surfaces of the walls of the vapor-condensing chamber 5 and flow down the same into the annular drip-trough or catch-basin 4, which communicates by a detachable pipe 14 with a suitable vessel or receptacle 15, placed in position to receive the pure and aerated distilled water. By this process of distillation the condensation and aeration of the vapor of water are effected rapidly by reason of the expanded condition of the heated air admitted to the vapor-condensing chamber. The heated and expanded air not only has the greatest capacity for the absorption of moisture, thus enabling it to take up the vapor of water readily, but, furthermore, while in this expanded condition the air more easily relieves itself of foreign gases that it may have held in a normal state.

The heating of the air by passing it through highly-heated filtering material tends to the destruction of germs and other impurities, and the subsequent mingling of such purified air with the vapor of water and the consequent thorough aeration of the water of condensation results in the economical production of a pure, sweet, and palatable liquid.

It will be observed that by providing the vapor-condensing chamber with an outlet for the escape of ammoniacal or other gases there is no liability of having these gases recondensed with the vapor of water. The gases of the water escape largely by their expansive force previous to the boiling of the water. When vaporization of the water takes place, a small quantity of vapor may escape through the outlet from the vapor-condensing chamber, but this loss of watery vapor is not sufficient to interfere with the process of distillation, while the constant tendency to a vacuum in the vapor-condensing chamber induces an upward current through the air filtering and heating flue or chamber 11 and thus keeps the condensing-chamber supplied with pure air, which in its expanded condition readily combines with the aqueous vapor as it is condensed, and thus the distilled water is quickly aerated.

By drawing off the contents of the cold-water-condensing chamber from time to time, conveying the water thus drawn off to the evaporating vessel, and replenishing the cold-water chamber with water at a low temperature the operation of condensation is greatly facilitated and a large economy effected in the process of distillation.

The heating and consequent expansion of the air prior to introducing it into the condensing-chamber is of the greatest importance in promoting the absorption and condensation of the vapor in the condensing-chamber; and when the air to be heated is not sufficiently pure it is always best to have it filtered before it is allowed to come in contact with the vapor in the distilling apparatus.

What we claim as our invention is—

1. The combination in a water-distilling apparatus, of an evaporating vessel, a vapor-condensing chamber communicating with the evaporating vessel, a hot-air flue leading into the condensing-chamber, non-combustible air-filtering material located in said hot-air flue, and an annular drip-trough or catch-basin at the base of the condensing-chamber to receive and convey away the distilled and aerated water, substantially as described.

2. The combination in a water-distilling apparatus, of an evaporating vessel having its rim surrounded by an annular trough and provided with a vertical hot-air flue, non-combustible air-filtering material in said flue, a vapor-condensing chamber communicating directly with the evaporating vessel and its hot-air flue and annular trough and provided with an outlet for escape of gases, a cold-water chamber surrounding the condensing-chamber, a pipe connection having an upper leg in communication with the cold-water chamber and a lower leg or pipe extended through the said cold-water chamber and into the condensing-chamber to discharge water into the evaporating vessel, and a valve located in said pipe connection, substantially as described.

In testimony whereof we have hereunto set our hands and affixed our seals in presence of two subscribing witnesses.

CONFUCIUS CHASE. [L. S.]
    ANDREW J. CHASE. [L. S.]

Witnesses:
 JAS. L. NORRIS,
 JAMES A. RUTHERFORD.